(12) United States Patent
McCuskey et al.

(10) Patent No.: US 10,498,872 B2
(45) Date of Patent: Dec. 3, 2019

(54) MOBILE DEVICE CASE

(71) Applicant: Domain Vista Pty. Ltd., Victoria (AU)

(72) Inventors: Kane Daniel McCuskey, Victoria (AU); Peter Joseph McCuskey, Victoria (AU)

(73) Assignee: DOMAIN VISTA PTY. LTD. (AU)

( * ) Notice: Subject to any disclaimer, the term of this patent is extended or adjusted under 35 U.S.C. 154(b) by 0 days.

(21) Appl. No.: 16/060,594

(22) PCT Filed: Dec. 8, 2016

(86) PCT No.: PCT/AU2016/051203
§ 371 (c)(1),
(2) Date: Jun. 8, 2018

(87) PCT Pub. No.: WO2017/096425
PCT Pub. Date: Jun. 15, 2017

(65) Prior Publication Data
US 2018/0375981 A1  Dec. 27, 2018

(30) Foreign Application Priority Data

Dec. 9, 2015 (AU) .................. 2015905427
May 9, 2016 (AU) .................. 2016901700

(51) Int. Cl.
*H04M 1/18* (2006.01)
*H04M 1/21* (2006.01)
*H02J 7/00* (2006.01)
*A45C 11/00* (2006.01)
(Continued)

(52) U.S. Cl.
CPC .............. *H04M 1/21* (2013.01); *A45C 11/00* (2013.01); *A45D 1/04* (2013.01); *A45D 2/001* (2013.01);
(Continued)

(58) Field of Classification Search
CPC .... H04M 1/21; H04M 1/185; H04M 1/72527; A45D 1/04; A45D 2/001
See application file for complete search history.

(56) References Cited

U.S. PATENT DOCUMENTS 5,844,759 A * 12/1998 Hirsh .................. H02H 11/005
361/42
2005/0116542 A1 * 6/2005 Kihara ...................... H02J 3/14
307/29

(Continued)

FOREIGN PATENT DOCUMENTS

EP      2676567 A1    12/2013
WO   2017096425 A1    6/2017

OTHER PUBLICATIONS

"International Application Serial No. PCT/AU2016/051203, Search Report dated Jan. 13, 2017", 3 pgs.

(Continued)

*Primary Examiner* — Charles N Appiah
*Assistant Examiner* — Xiang Zhang
(74) *Attorney, Agent, or Firm* — Kwan & Olynick LLP

(57) ABSTRACT

A mobile device having a hair straightening iron, a battery and a case body is disclosed. The case body can include a recess for receiving a mobile device and a charging port to connect to the mobile device when the mobile device is in the case body. The case body can include a switch for connecting the hair straightening iron to the battery to selectively power the hair straightening iron.

16 Claims, 8 Drawing Sheets

(51) Int. Cl.
*A45D 1/04* (2006.01)
*A45D 2/00* (2006.01)
*H04M 1/725* (2006.01)
*H04M 1/04* (2006.01)

(52) U.S. Cl.
CPC .......... *H02J 7/0042* (2013.01); *H02J 7/0054* (2013.01); *H04M 1/185* (2013.01); *H04M 1/72527* (2013.01); *A45C 2011/002* (2013.01); *A45D 2001/045* (2013.01); *H04M 1/04* (2013.01)

(56) References Cited

U.S. PATENT DOCUMENTS

| | | |
|---|---|---|
| 2010/0147710 A1 | 6/2010 | Lebauer |
| 2011/0190953 A1* | 8/2011 | Park ................... G05B 15/02 700/291 |
| 2013/0098389 A1 | 4/2013 | Uwano |
| 2014/0208601 A1* | 7/2014 | Battin .................. A45D 27/46 30/538 |
| 2014/0217866 A1 | 8/2014 | Harris |
| 2015/0215439 A1 | 7/2015 | Stanimirovic et al. |
| 2015/0335120 A1 | 11/2015 | Moore et al. |

OTHER PUBLICATIONS

McCuskey, Kane D. et al., Australian Application Serial No. 2015905427, filed Dec. 9, 2015, 5 pgs.

McCuskey, Kane D. et al., "A Mobile Device Case", Australian Application Serial No. 201601700, filed May 9, 2016, 27 pgs.

\* cited by examiner

MOBILE DEVICE CASE

CROSS-REFERENCE TO RELATED APPLICATIONS

This application is a national phase entry of PCT Application No. AU2016051203, filed on Dec. 8, 2016, which claims priority to AU Provisional Patent Application No. 2015905427, filed on Dec. 9, 2015 and AU Provisional Patent Application No. 2016901700 filed on May 9, 2016. Each of these applications is incorporated herein by reference in its entirety for all purposes.

The invention relates to a mobile device case having a hair straightening iron.

Mobile devices such as media players or mobile phones, as known as cell phones must be supplied with electrical energy, usually from rechargeable batteries, for continuing operation. However, if the battery life is not sufficiently long or if a source of power is not readily available to re-charge the battery, the mobile device may cease to be usable.

Portable hair straightening irons can have electrically rechargeable batteries such that the portable hair straightening irons can be used to straighten hair when a mains source of electrical power is not available.

Having separate additional batteries supplying electrical power for both a hair straightening iron and a mobile device can be bulky and inconvenient to be carried on a person.

According to a first aspect of the present invention, there is provided a mobile device case having a hair straightening iron, a battery and a case body, the case body having a recess for receiving a mobile device and a charging port to connect the battery to the mobile device when so received, the case having a switch for connecting the hair straightening iron to the battery to selectively power the hair straightening iron.

Preferably, the hair straightening iron is extendable and retractable relative to the case body between a retracted configuration wherein the hair straightening iron is positioned adjacent to the case body for storage and an extended configuration wherein the case body forms a graspable portion for operation of the hair straightening iron.

Preferably, the hair straightening iron has a releasable fastener to selectively allow the hair straightening iron to be locked in either the extended or retracted configuration.

Preferably, the hair straightening iron is slidably extendable and retractable.

Preferably, the hair straightening iron is pivotally extendable and retractable relative to the case body.

Preferably, the switch is operable by slidably extending and retracting the hair straightening iron in a direction parallel to a plane of the case body.

Preferably, the switch is operable by pivotally extending and retracting the hair straightening iron in a direction parallel to a plane of the case body.

Preferably, the switch is operable by pivotally extending and retracting the hair straightening iron in a direction perpendicular to a plane of the case body.

Preferably, the recess and the hair straightening iron are on opposing sides of the case body.

Preferably, the recess allows the mobile device to be so received such that a screen of the mobile device is visible.

Preferably, the hair straightening iron has a visual indicator indicating when the hair straightening iron is being powered.

Preferably, the hair straightening iron has a pair of arms, each arm having a respective one of a pair of inwardly-facing heating plates, the arms being pivotally joined at one end so that the opposite ends of the arms are openable and closable between an open configuration where hair is receivable between the heating plates and a closed configuration where heat generated in the heating plates from electrical power supplied by the battery is transferred via the heating plates to straighten the hair.

Preferably, the hair straightening iron has at least one sensor. The at least one sensor can be a pressure sensor or a temperature sensor. Preferably, the at least one temperature sensor is in contact with one of said heating plates.

Preferably, the hair straightening iron has a visual indicator indicating when the hair straightening iron is at a temperature above a pre-selected operating temperature.

Preferably, the hair straightening iron has a visual indicator indicating when the hair straightening iron is at a temperature below a pre-selected storage temperature.

Preferably, the hair straightening iron is releasably attachable to the case body.

Preferably, the hair straightening iron has a plug and the mobile device case has a corresponding port for receiving the plug such that the hair straightening iron is electrically connectable to the mobile device case.

Preferably, the mobile device is a mobile phone.

According to a second aspect of the present invention, there is provided a system having a mobile device case as described above, and a mobile device received in the recess of the mobile device case body, the mobile device case having a processor wherein the mobile device case processor is in communication with a mobile device processor when so received.

Preferably, the mobile device processor and the mobile device case processor are in communication via the charging port.

Preferably, the mobile device case processor is configured to operate the switch for selectively powering the hair straightening iron.

Preferably, the mobile device has a memory and instructions executable by the mobile device processor stored in the memory, wherein the memory has instructions to receive from a user a response for selectively powering the hair straightening iron and wherein, based on that response, to provide instructions to the mobile device case processor to operate the switch for selectively powering the hair straightening iron.

Preferably, the memory has instructions to display the status of the switch on the screen of the mobile device.

Preferably, the memory has instructions to receive from a user a response selecting the operating temperature of the hair straightening iron and wherein, based on that response, to provide instructions to the mobile device case processor to deliver electrical energy from the battery to the hair straightening iron.

Preferably, the memory has instructions to display the selected operating temperature of the hair straightening iron.

Preferably, the mobile device processor is configured to receive an output from at least one sensor. The at least one sensor can be a pressure sensor or a temperature sensor.

Preferably, the memory has instructions configured to display the output from the at least one sensor on the screen of the mobile device.

Preferably, the memory has instructions to compare the output from the at least one temperature sensor with the selected operating temperature.

Preferably, when the output from the temperature sensor indicates a temperature greater than the selected operating temperature, the memory has instructions to display a message on the screen of the mobile device that the hair straightening iron is at an operating temperature.

Preferably, the memory has instructions to compare the output from the at least one temperature sensor with a selected storage temperature and wherein, when the output from the temperature sensor indicates a temperature is lower than the selected storage temperature, the memory has instructions to display a message on the screen of the mobile device that the hair straightening iron is safely retractable.

Preferably, the selected storage temperature is at or less than 40° C.

Preferably, the at least one sensor is a sensor able to detect the retracted or extended configuration of the hair straightening iron. The at least one sensor can be a pressure sensor.

Preferably, the memory has instructions to display the configuration of the hair straightening iron on the screen of the mobile device.

The present invention will now be described, by way of non-limiting example only, with reference to the accompanying drawings, in which.

Figure 1:
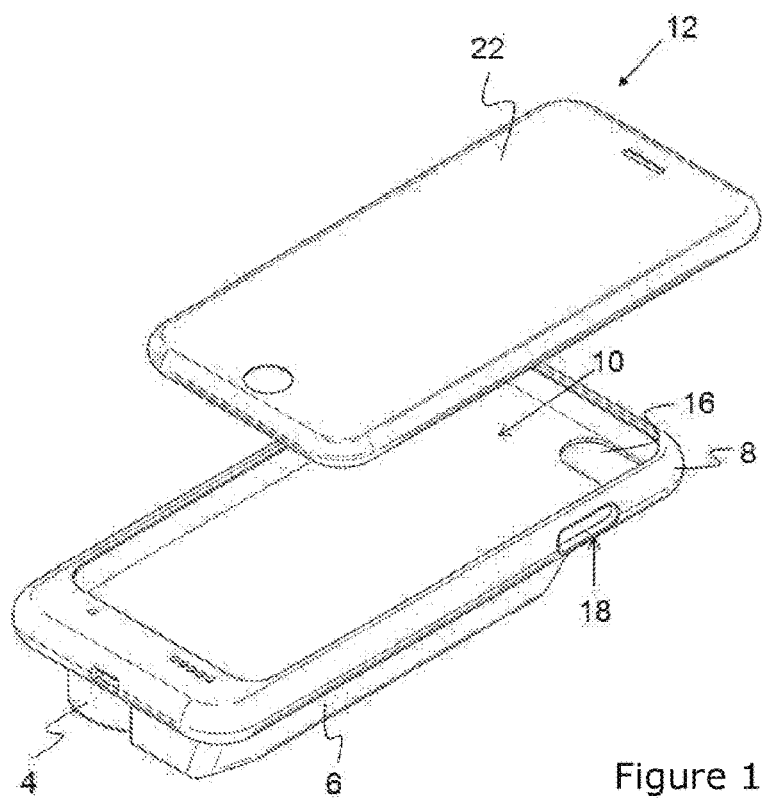
FIG. 1 is a front perspective view of a mobile device case with a mobile device according to a preferred embodiment of the present invention.

FIGS. 1 to 9B are different perspective views of a mobile device case 2 according to preferred embodiments of the present invention. The mobile device case 2 has a hair straightening iron 4, a battery 6 and a case body 8. The case body 8 has a recess 10 for receiving a mobile device 12. The recess 10 has a peripheral wall that substantially conforms to the outer circumference of the mobile device 12, the wall being resiliently grippable such that the mobile device 12 is retained within the recess 10. The recess 10 also has a charging port (not shown) to connect the battery 6 to the mobile device 12 when the mobile device 12 is received within the recess 10 of the case body 8.

The case body 8 also has openings 16, 18 which allow normal functioning of the mobile device 12 while it is received in the case body 8, such as an opening 16 for the camera lens and at least one opening 18 for allowing access to any buttons on the mobile device 12. Alternatively, the mobile device case 2 can have at least one flexible portion (not shown) to allow deformation of the mobile device buttons by finger pressure.

The case body 8 has a switch 20 for connecting the hair straightening iron 4 to the battery 6 to selectively power the hair straightening iron 4. And therefore, the mobile device case 2 can be used to charge a mobile device 12 or alternatively to power a hair straightening iron 4. It is also envisaged that in an embodiment of the invention, the mobile device case 2 can be used to recharge the mobile device 12 and provide electrical energy to power the hair straightening iron 4 simultaneously. This provides a mobile device case 2 that is able to fulfill both functions in a compact configuration that is convenient to carry and use.

The battery 6 is a rechargeable battery, which can easily be recharged by a connection to a mains source of power such as a USB power supply. The capacity of the mobile device case 2 to recharge the mobile device 12 received in its recess 10 and to power the hair straightening iron 4 will be determined by the size and capacity of the battery 6. However, it is expected that the hair straightening iron 4 will be able to operate between 2400 and 4200 mAh for at least 60 minutes, although it is understood that a person skilled in the art would be able to provide additional battery capacity depending on the battery technology in use. If required, the battery 6 can be recharged via the USB power supply while being able to power the hair straightening iron 4 and recharge the mobile device 12 received in the recess of the case body 8.

It can be understood by a person skilled in the art that the mobile device case 2 can easily be configured to be used with any available mobile device 12, including media players, examples of which include Apple iTouch or iPod, or small tablets. These mobile devices 12 can also include mobile phones including basic mobile phones and mobile phones having advanced computational abilities, cameras, sensors and browsing and data capabilities known as 'smart phones'.

Figure 2:
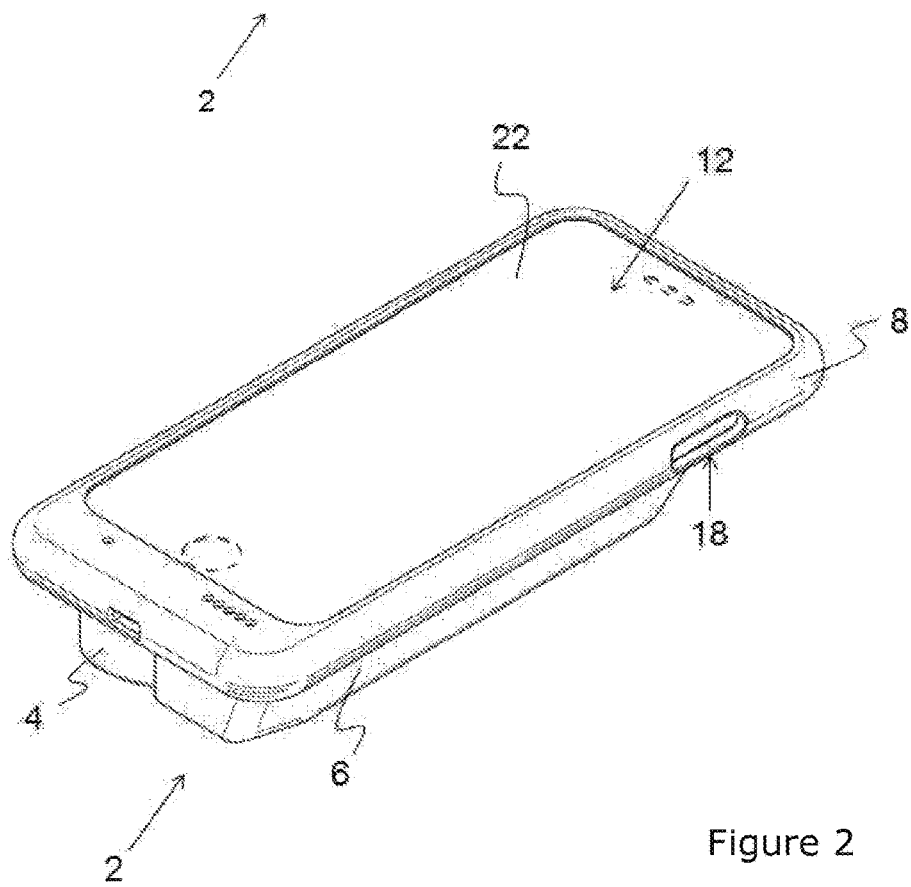
FIG. 2 is a front perspective view of the mobile device case of FIG. 1 with the mobile device received therein.

The recess 10 of the case body 8 is configured such that the mobile device 12 can be received in the case body 8 and where a screen 22 of the mobile device 12 faces outwards and is therefore visible by a user, as shown particularly in FIG. 2.

Figure 3:
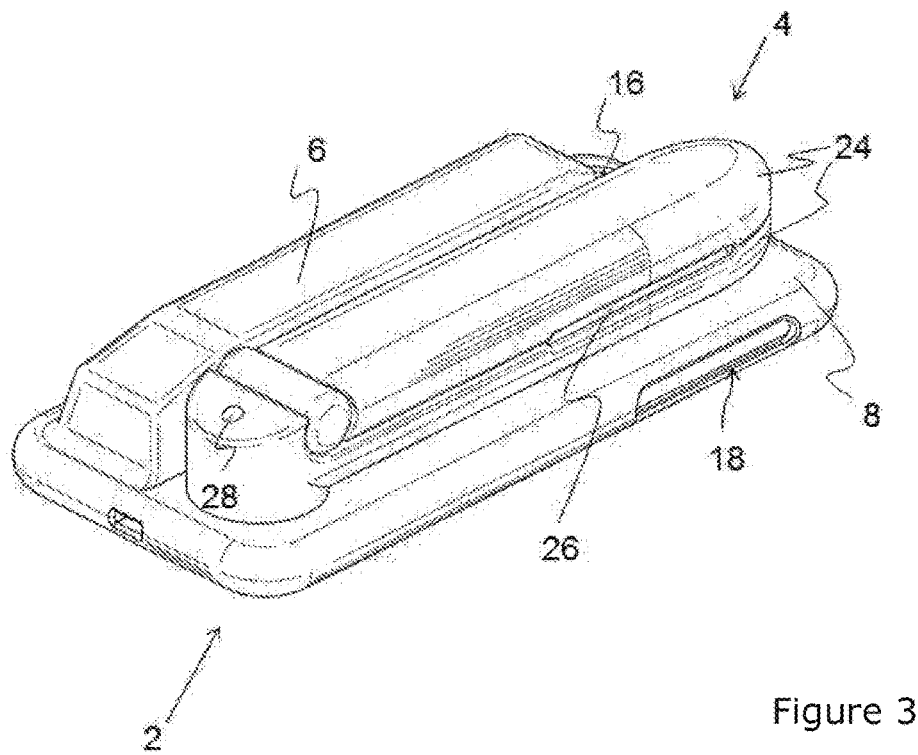
FIG. 3 is a rear perspective view of the mobile device case of FIGS. 1 and 2.

FIGS. 1 to 3 also show that the recess 10 can be provided on a front face of the case body 8 while the hair straightening iron 4 is provided on a rear face of the case body 8. FIGS. to 1 to 9B show that the hair straightening iron 4 and the battery 6 can be provided in various arrangements on the rear face. In the embodiments shown in FIGS. 3, 4A, 4B, 8, 9A and 9B, the hair straightening iron 4 and battery 6 are provided in a side-by-side configuration on the rear side of the case body 8. In another embodiment shown in FIGS. 6A and 6B, the battery 6 is provided between the case body 8 and the hair straightening iron 4, while in the embodiment of FIGS. 7A and 7B the battery 6 is formed such that it has a recess 68 configured so as to receive the hair straightening iron 4 therein.

The hair straightening iron 4 is extendable into an extended configuration where the case body 8 forms a grasping portion for operation of the hair straightening iron 4. Once any hair straightening activities has been completed, the hair straightening iron 4 is retractable into a retracted configuration wherein the hair straightening iron 4 is positioned adjacent to the case body 8 for storage. In particular, FIG. 3 shows the mobile device case 2 where the hair straightening iron 4 is in a retracted configuration, while FIGS. 4A, 4B, 5 and 6 show the mobile device case 2 where the hair straightening iron 4 is in an extended configuration.

The hair straightening iron 4 can be pivotably extendable and retractable so as to be able to extend and retract relative to the case body 8. As shown more particularly in FIG. 4A, the hair straightening iron 4 is pivotable in a direction that is parallel to a plane of the mobile device case 2, as indicated by the double-headed arrow A. The hair straightening iron 4 is pivotable such that the hair straightening iron 4 can be oriented up to 180° relative to the retracted configuration for ease of operation.

Alternatively, the hair straightening iron 4 can be pivotable in a direction that is perpendicular to the plane of the mobile device case 2 as shown in FIGS. 6A to 7B as indicated by the double-headed arrow B.

Figure 8:
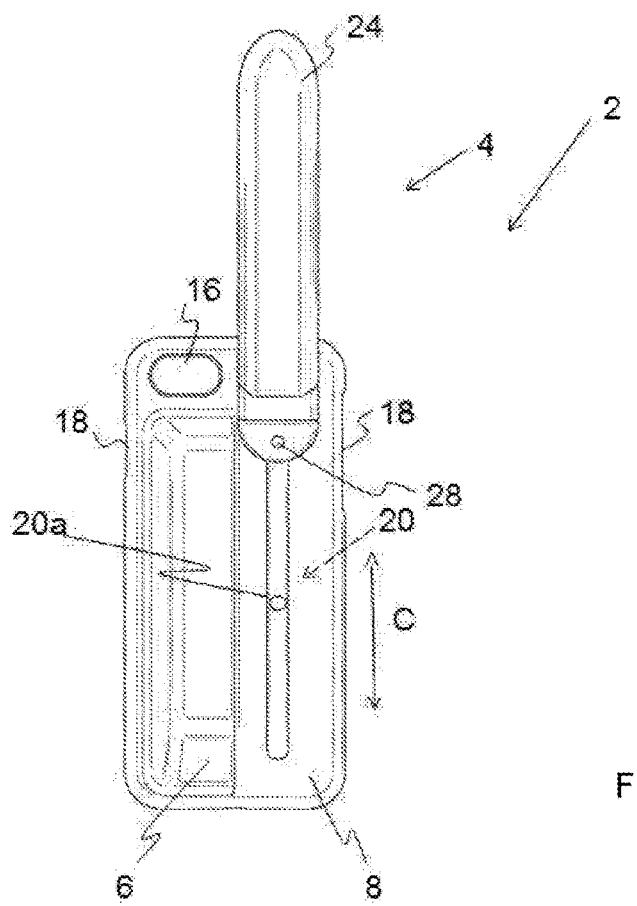
FIG. 8 is a rear view of the mobile device case with the hair straightening iron in an extended configuration according to another embodiment of the present invention.
Figure 9A:
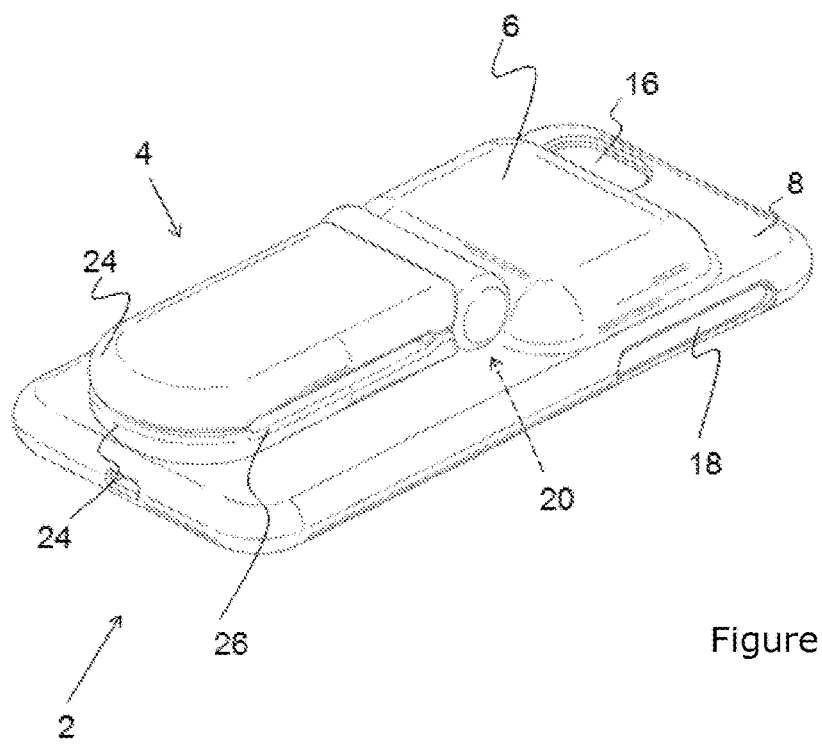
FIG. 9A is a front perspective view of a mobile device according to another embodiment of the invention.
Figure 9B:
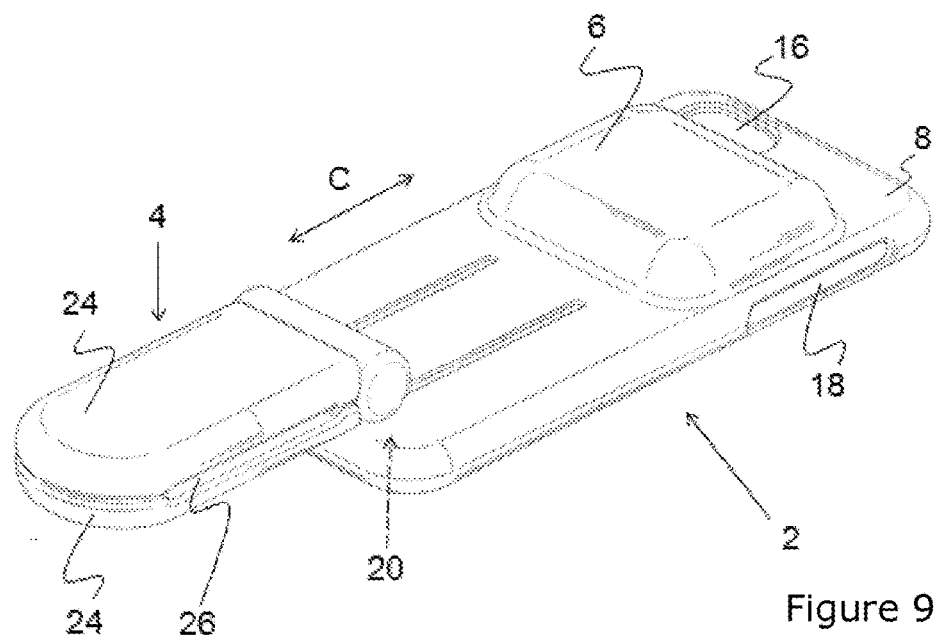
FIG. 9B is a front perspective view of the mobile device of FIG. 9A in extended configuration.

In other embodiments, the hair straightening iron 4 is slidably extendable into the extended configuration and retractable into the retracted condition for storage as shown in FIGS. 8 to 9B. In particular, the hair straightening iron 4 is slidable in a direction that is parallel to the plane of the mobile device case 2, as shown by the double-headed arrow C.

The hair straightening iron 4 has a pair of arms 24, the arms 24 being pivotally joined at one end. Each arm 24 has a respective one of a pair of inwardly facing heating plates 26, the heating plates 26 having heating elements, which convert the electricity supplied by the battery 6 into heat. The other end of the arms 24 are operable and closable between an open configuration where hair is receivable between the heating plates 26 and a closed configuration where the generated heat is transferred via the heating plates 26 to the hair.

The hair straightening iron 4 has a releasable fastener (not shown) which can lock or unlock the hair straightening iron 4 in either the extendable or retracted configuration. The releasable fastener can be of a push-button type.

The hair straightening iron 4 can also have a visual indicator 28 which indicates active operation of the hair straightening iron 4. The visual indicator 28 can be provided on the hair straightening iron 4.

Figure 4A:
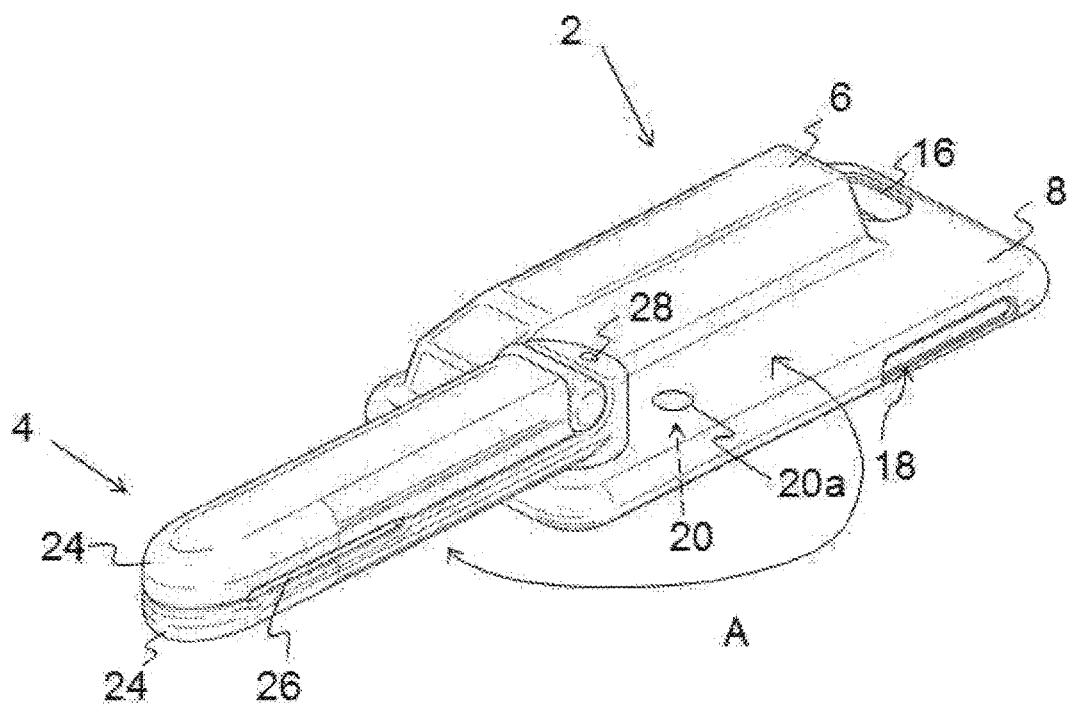
FIGS. 4A and 4B are rear perspective views of the mobile device case with a hair straightening iron in an extended configuration.
Figure 4B:
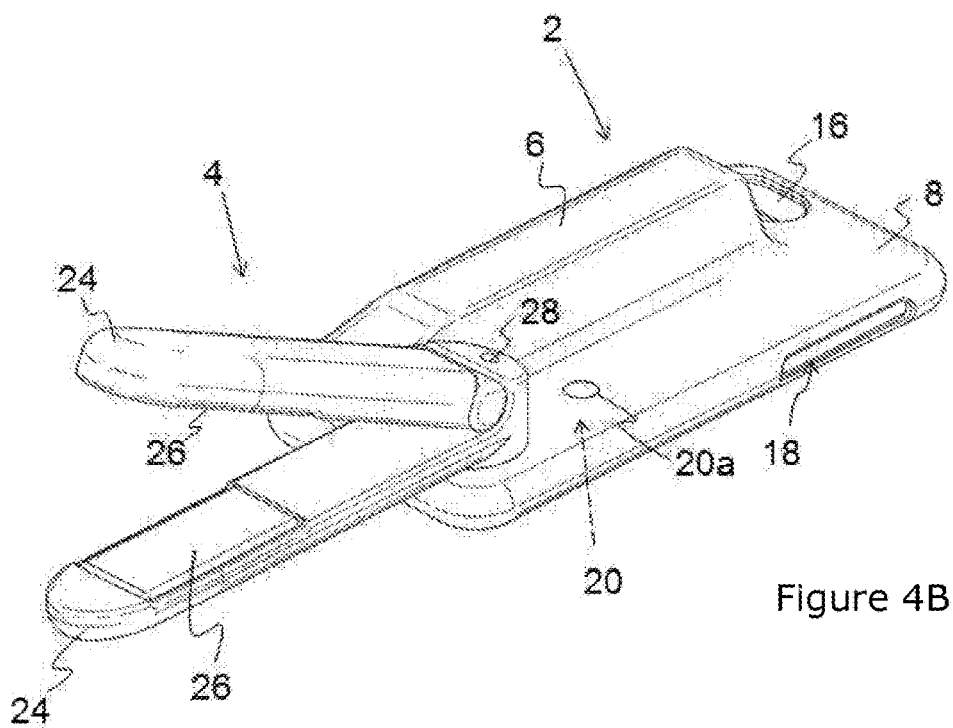
Figure 5:
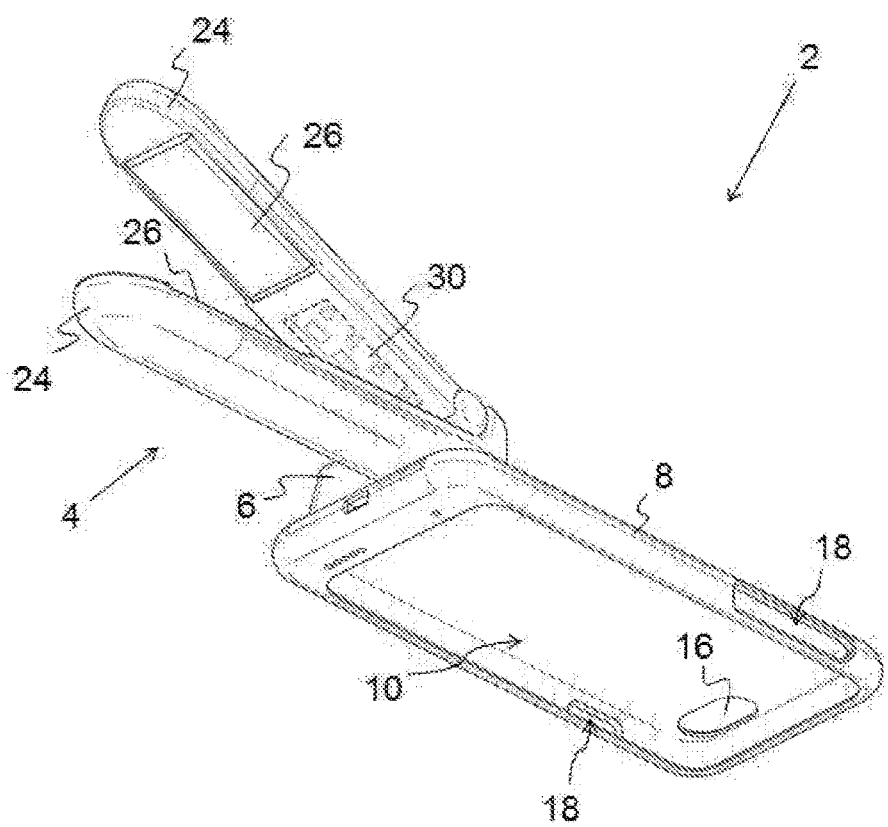
FIG. 5 is a front perspective view of the mobile device case of FIG. 4B.
Figure 6A:
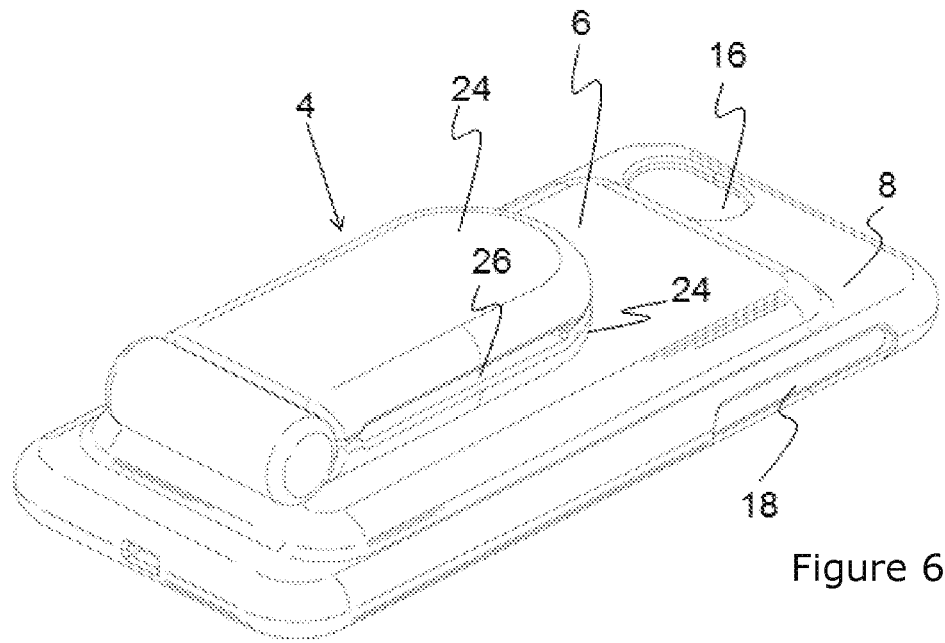
FIG. 6A is a front perspective view of a mobile device according to another embodiment of the invention.
Figure 6B:
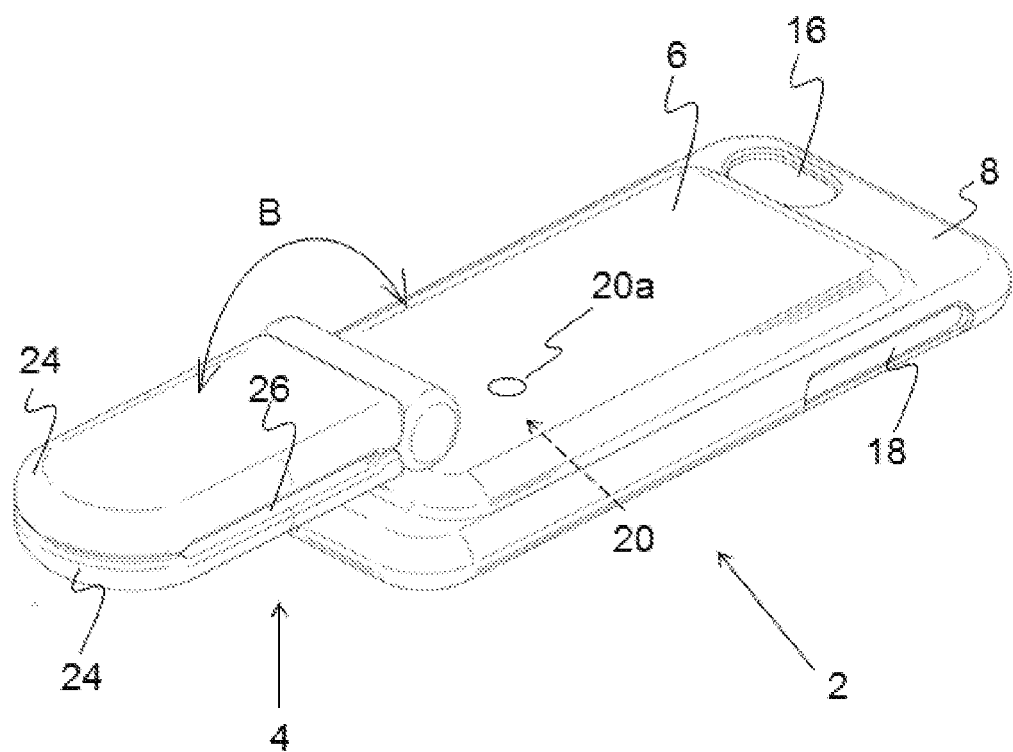
FIG. 6B is a front perspective view of the mobile device of FIG. 6A in an extended configuration.
Figure 7A:
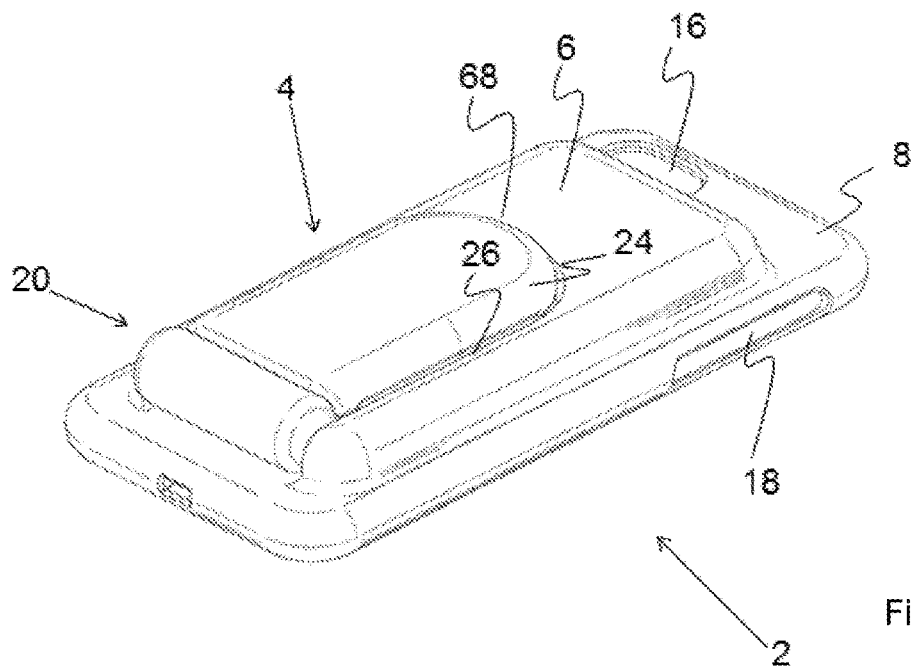
FIG. 7A is a front perspective view of a mobile device according to yet another embodiment of the invention.
Figure 7B:
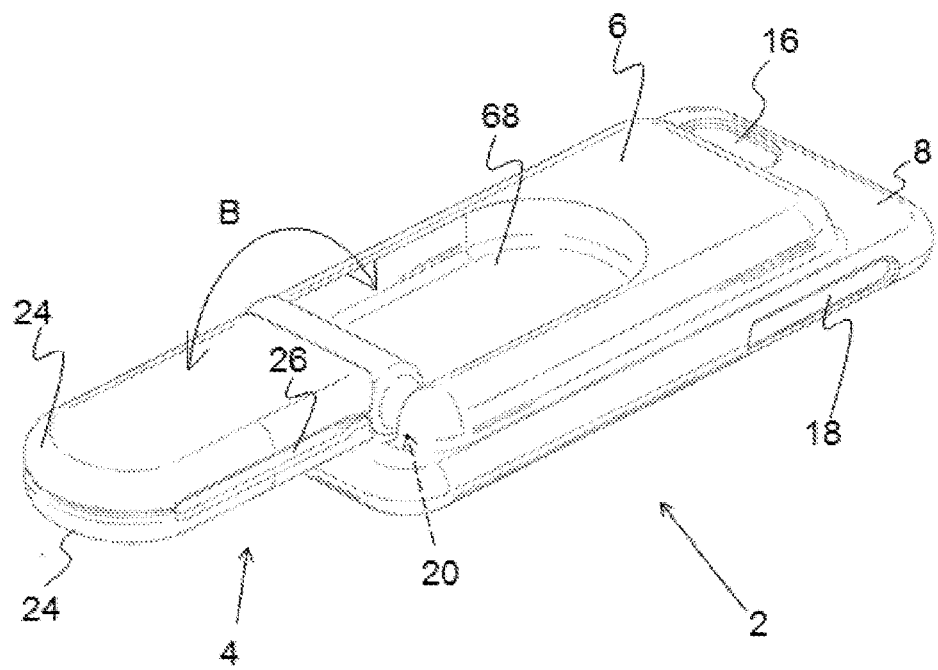
FIG. 7B is a front perspective view of the mobile device of FIG. 7A in extended configuration.

The switch 20 for selectively powering the hair straightening iron 4 can be operable by extending or retracting the hair straightening iron 4 relative to the case body 8. As shown in FIGS. 4A and 4B, the switch 20 is operable by pivotally extending or retracting the hair straightening iron 4. In one embodiment, the switch 20 is operable by pivoting the hair straightening iron 4 in a direction parallel to the plane of the mobile device case 2 (as shown in FIGS. 3 and 4A), while in an alternate embodiment the switch 20 is operable by pivoting the hair straightening iron 4 in a direction perpendicular to the plane of the mobile device case 2 as shown in FIGS. 6A to 7B.

In another embodiment, the switch 20 is operable by sliding the hair straightening iron 4 between the retracted and extended configurations. For example, the switch 20 may be arranged to sense when the hair straightening iron 4 is in the retracted configuration and ensure that the hair straightening iron 4 is not being powered as a safety feature. In the embodiment shown in FIGS. 3 and 4A, the switch 20 is of a push-button type located within the casing of the hair straightening iron 4 and has an actuating element 20a (FIG. 4A), which projects through the wall of the hair straightening iron casing such that when the hair straightening iron 4 is in the retracted configuration, the hair straightening iron 4 bears against the actuating element 20a to cause it to be moved inwardly and to condition the switch 20 to interrupt power supply to the hair straightening iron 4. When the hair straightening iron 4 is moved to the extended configuration for use as shown in FIG. 4A, the actuating element 20a moves outwardly under influence of an internal spring to cause the switch 20 to be conditioned to supply power to the hair straightening iron 4.

Alternatively, as shown in FIGS. 7A, 7B, 9A and 9B, the switch 20 can be provided internally in the casing of the hair straightening iron 4 and brought into engagement with the case body 8 for interruption of the power supply while allowing supply of the power when not so engaged.

When the hair straightening iron 4 is slidable as shown in FIG. 8, the switch 20 may be of similar form to the above, with the actuating element 20a being moved by sliding engagement with the hair straightening iron 4, the outer end of the actuating element 20a positioned on the case body 8 as in FIG. 8, and being domed or otherwise shaped to cooperate with the hair straightening iron 4 to move inwardly by sidewards camming engagement by the hair straightening iron 4. In the arrangements shown in FIGS. 9A and 9B, the switch 20 may be alternatively be mounted within the casing of the hair straightening iron 4 for sliding engagement with a surface of the case body 8.

A processor 30 for operation of the hair straightening iron 4 can be contained in at least one arm 24 or in the case body 8. The processor 30 can control the amount of power delivered to the hair straightening iron 4 and monitor at least one sensor 34 (not shown) on at least one heating plate 26 so as to be able to provide the desired heat transfer to the hair from the hair straightening iron 4. The processor 30 can be configured so as to be able to operate the switch 20.

The at least one sensor 34 can be a temperature sensor, preferably in proximity or in contact with a heating plate 26, so that the temperature of the heating plate 26 can be monitored. The visual indicator 28 could, alternatively, indicate when the heating plate(s) 26 are at or above a selected operating temperature so that the user knows when the hair straightening iron 4 is at a suitable temperature for use. In another embodiment, the visual indicator 28 can indicate when the temperature of the heating plates 26 is at or below a storage temperature, so that the user knows when the hair straightening iron 4 is at a safe temperature to be retracted into the retracted configuration for storage.

Figure 10:
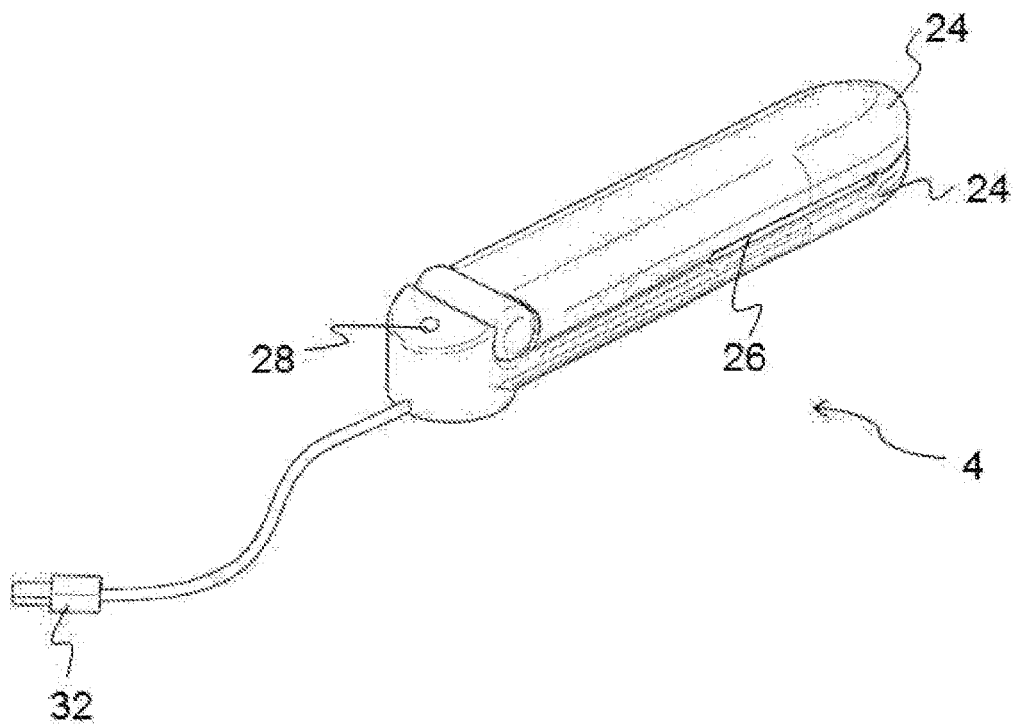
FIG. 10 is a releasably attachable hair straightening iron to be used with a mobile device case.

As shown in FIG. 10, the hair straightening iron 4 can be releasably attachable to the case body 8 and where the hair straightening iron 4 has an electrical plug 32 which electrically connects the hair straightening iron 4 to a corresponding port (not shown) in the mobile device case 2.

In a further embodiment of the present invention, the switch 20 for selectively providing power to the hair straightening iron 4 from the battery 6 can be operable using instructions stored in a memory 36 provided in the mobile device 12. The instructions are executable by the mobile device processor 36 and are configured to communicate with the processor 30 of the mobile device case 2 via an electrical connection, such as a charging port. In particular, the mobile device processor 36, based on a response received, can send instructions to be performed by the mobile device case processor 30, for example, to operate the switch 20 for operating the hair straightening iron 4 to turn it on or off.

The instructions can include receiving and monitoring of an output of at least one sensor 34 on the hair straightening iron 4. The at least one sensor 34 can be a temperature sensor, the output of which can indicate the temperature of the heating plates 26. The at least one sensor 34 can be a pressure sensor, which can indicate whether the hair straightening iron 4 is in the retracted or extended configuration. The instructions can also be configured to receive a response from the user to select the operating temperature or to control the amount of power delivered to the hair straightening iron 4 from the battery 6 ('power setting' or 'operating temperature'). The instructions can also display to a user the output of the at least one sensor 34, the status of hair straightening iron 4 ('on/off status') and the amount of electrical power being delivered ('power setting' or 'operating temperature') on the screen 22 of the mobile device 12.

The instructions can also include receiving the output of the at least one sensor, such as a temperature or pressure sensor 34 and displaying a message indicating the status of the output on the screen 22 of the mobile device 12. For example, if the at least one pressure sensor 34 indicates that the hair straightening iron 4 is in a retracted or extended configuration, that retracted or extended status can be displayed on the screen 22. Further, the instructions can include comparing the output of the at least one temperature sensor 34 with a pre-selected operating or storage temperature, and displaying the result of that comparison.

For example, if the temperature indicated by the temperature sensor 34 shows that the temperature of the heating plates 26 is higher or lower than that of the pre-selected operating temperature, the instructions can include displaying messages that the hair straightening iron 4 is ready or not ready to use. For example, if the temperature indicated by the temperature sensor 34 shows that the temperature of the heating plates 26 is higher or lower than that of the pre-selected storage temperature, the instructions can include displaying messages that the hair straightening iron 4 is ready or not ready to be positioned into a retracted configuration.

Figure 11:
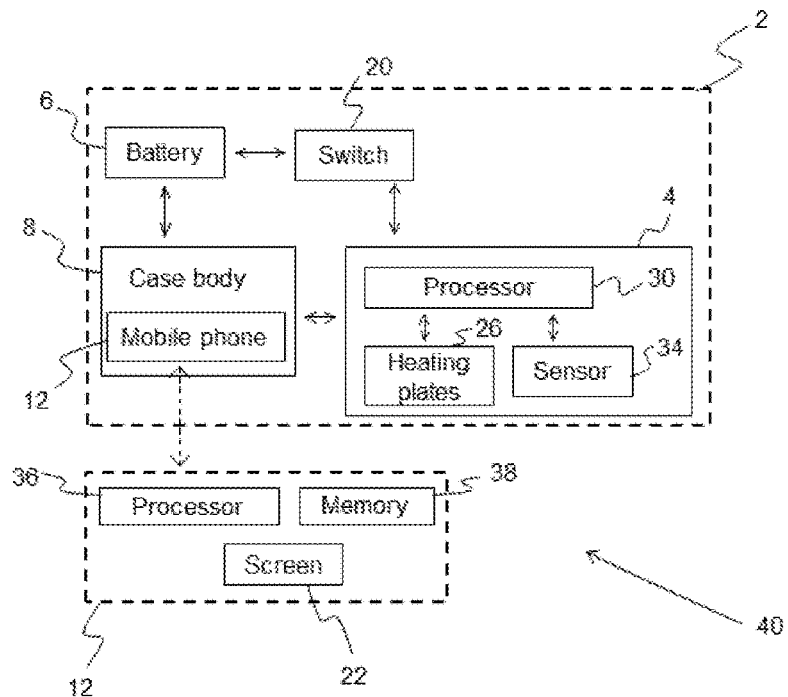
FIG. 11 is a block diagram of a system having a mobile device case and a mobile device according to an embodiment of the present invention.
Figure 12:
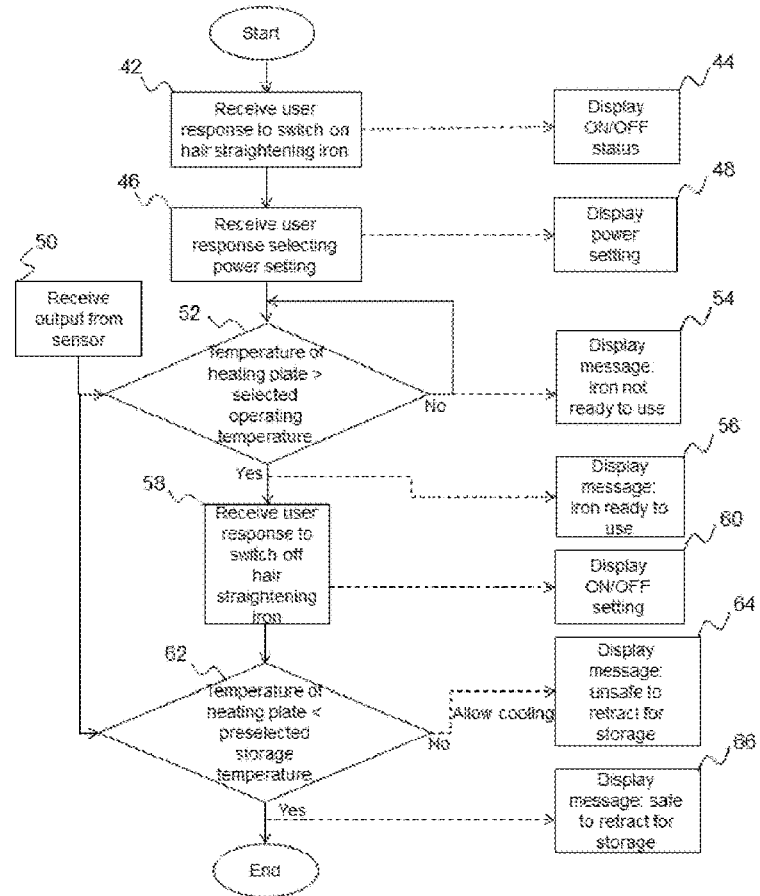
FIG. 12 is a flow diagram with an example set of instructions that can be performed by the system of FIG. 11.

FIG. 12 shows an exemplary use of the system 40 of a mobile device case 2 and a mobile device 12 (shown in FIG. 11) which can further operate the hair straightening iron 4.

The system 40, executing instructions stored in the memory 38, can first receive a response from a user (see step 42) to turn on the hair straightening iron 4. The system 40 can then display the on/off status (see step 44) on the screen 22 of the mobile device 12. The system 40 can then receive a user response (see step 46) to select the power setting of the hair straightening iron 4, which determines the operating temperature of and/or power delivered to the heating plates 26. The power setting and/or operating temperature can also be displayed (see step 48) on the screen 22 of the mobile device 12.

Once the hair straightening iron 4 has been switched on and the power setting/operating temperature has been selected, electrical power from the battery 6 is provided to the heating elements in the heating plates 26, the temperature of which can be monitored by the at least one temperature sensor 34. Each heating plate 26 may have a temperature sensor 34. The output of the at least one temperature sensor 34 can be received (see step 50) by the system 40 and the temperature indicated by that temperature sensor 34 can be compared to an operating temperature (see step 52) previously selected by the user.

If the system 40 determines that the temperature indicated by the at least one temperature sensor 34 is lower than that of the selected operating temperature, the system 40 can display to a screen 22 of the mobile device that the iron is not yet ready to use (see step 54). Similarly, if the system 40 determines that the temperature indicated by the at least one temperature sensor 34 is at or higher than the selected operating temperature, the system 40 can display to a screen 22 of the mobile device that the hair straightening iron 4 is ready to use (see step 56). The user can then use the hair straightening iron 4 for the desired period of time.

Once the user has completing straightening their hair, the mobile device processor 36, based on a user response received by the system 40 to switch off the hair straightening iron 4 (see step 58), can send instructions to be performed by the mobile device case processor 30, to operate the switch 20 for operating the hair straightening iron 4 to turn the hair straightening iron 4 off. The system 40 can then display that the hair straightening iron 4 is off (see step 60).

The temperature indicated by that temperature sensor 34 can be compared to an optimum pre-selected storage temperature (see step 62), whereby the temperature of the heating plates is at a safe level, for example, a temperature lower than 40° C. or lower than 30° C., such that the hair straightening iron 4 can be retracted safely into its retracted configuration. If the system 40 determines that the temperature indicated by the at least one temperature sensor 34 is higher than that of the pre-selected storage temperature, the system 40 can display to a screen 22 of the mobile device 12 a message that the hair straightening iron 4 is not yet ready to be retracted (see step 64). Similarly, if the system 40 determines that the temperature indicated by the at least one temperature sensor 34 is at or lower than the pre-selected storage temperature, the system 40 can display to a screen 22 of the mobile device a message that the hair straightening iron 4 is ready to be retracted (see step 66).

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The claims defining the invention are as follows:
1. A personal grooming system, comprising:
   a personal grooming apparatus being connectable to a power source, wherein the personal grooming apparatus comprises a heating element and a temperature sensor for detecting a temperature of the heating element; and
   a mobile device being connectable to the personal grooming apparatus such that the mobile device and the personal grooming apparatus are in communication when so connected, wherein the mobile device is configured to receive an output of the temperature sensor when the personal grooming apparatus and the mobile device are connected, and to display on a screen of the mobile device to a user the output of the temperature sensor;

wherein the personal grooming system is configured for operation of the personal grooming apparatus so as to be able to:
receive from the user a response to operate the personal grooming apparatus;
based on the response from the user, control operation of the personal grooming apparatus; and
compare the output from the temperature sensor with a selected operating temperature, such that:
when the output of the temperature sensor indicates a temperature at or greater than the selected operating temperature, the system is configured to display to the user a status indicating that hair straightening is at the selected operating temperature, and
when the output of the temperature sensor indicates a temperature lower than a preselected storage temperature, the system is configured to display to the user a status indicating that the personal grooming apparatus is safe to store.

2. A system according to claim 1, wherein the response from a user includes a response to selectively power the personal grooming apparatus and, based on that response, the system is configured to permit or prevent supply of power to the personal grooming apparatus.

3. A system according to claim 1, wherein the response from a user includes a response to select an operating rate of power the personal grooming apparatus and, based on that response, the system is configured to supply the operating rate of power to the personal grooming apparatus.

4. A system according to claim 1, wherein the mobile device is configured to display on a screen of the mobile device a status of power supplied to the personal grooming apparatus.

5. A personal grooming system according to claim 1, wherein the mobile device has a processor, memory, and instructions executable by the processor stored in the memory such that the mobile device is operable to control the personal grooming apparatus.

6. A personal grooming system according to claim 5, including a further processor associated with the personal grooming apparatus when so connected to the power source, the further processor being configured for receiving instructions from the mobile device for controlling operation of the personal grooming apparatus.

7. A personal grooming system according to claim 1, wherein the power source is a battery.

8. A personal grooming system according to claim 1, wherein the personal grooming apparatus is a hair straightening iron.

9. A method for operation of a personal grooming system, comprising the steps of:
connecting a personal grooming apparatus of the personal grooming system to a power source;
connecting the personal grooming apparatus to a mobile device of the personal grooming system such that they are in communication;
receiving a response from a user to operate the personal grooming apparatus, wherein the personal grooming system is configured such that, based on the response, the personal grooming system controls operation of the personal grooming apparatus;
receiving an output from a temperature sensor associated with the personal grooming apparatus, the mobile device being configured to receive an output of the temperature sensor when the personal grooming apparatus and mobile device are connected;
displaying on a screen of the mobile device to the user the output of the temperature sensor; and
comparing the output from the temperature sensor with a selected operating temperature, such that:
when the output of the temperature sensor indicates a temperature at or greater than the selected operating temperature, displaying to the user a status indicating that hair straightening is at the selected operating temperature, and
when the output of the temperature sensor indicates a temperature lower than a preselected storage temperature, displaying to the user a status indicating that the personal grooming apparatus is safe to store.

10. A method according to claim 9, including the step of receiving from the user a response to selectively power the personal grooming apparatus and, based on that response, the system is configured to send instructions to permit or prevent supply of power to the personal grooming apparatus.

11. A method according to claim 9, including the step of receiving from the user a response to select an operating rate of power of the personal grooming apparatus and, based on that response, the system is configured to send instructions to supply a selected rate of power to the personal grooming apparatus.

12. A method according to claim 9, including the step of displaying on a screen of the mobile device a status of power supplied to the personal grooming apparatus.

13. A method according to claim 9, wherein the step of controlling operation of the personal grooming apparatus includes that the mobile device is configured to control operation of the personal grooming apparatus.

14. A method according to claim 13, wherein the step of controlling operation of the personal grooming apparatus includes sending instructions from the mobile device, based on the response from the user, to a further processor for controlling operation of the personal grooming apparatus, the further processor being associated with the personal grooming apparatus when so connected to the power source.

15. A method according to claim 9, wherein the power source is a battery.

16. A method according to claim 9, wherein the personal grooming apparatus is a hair straightening iron.

* * * * *